Figure 1:
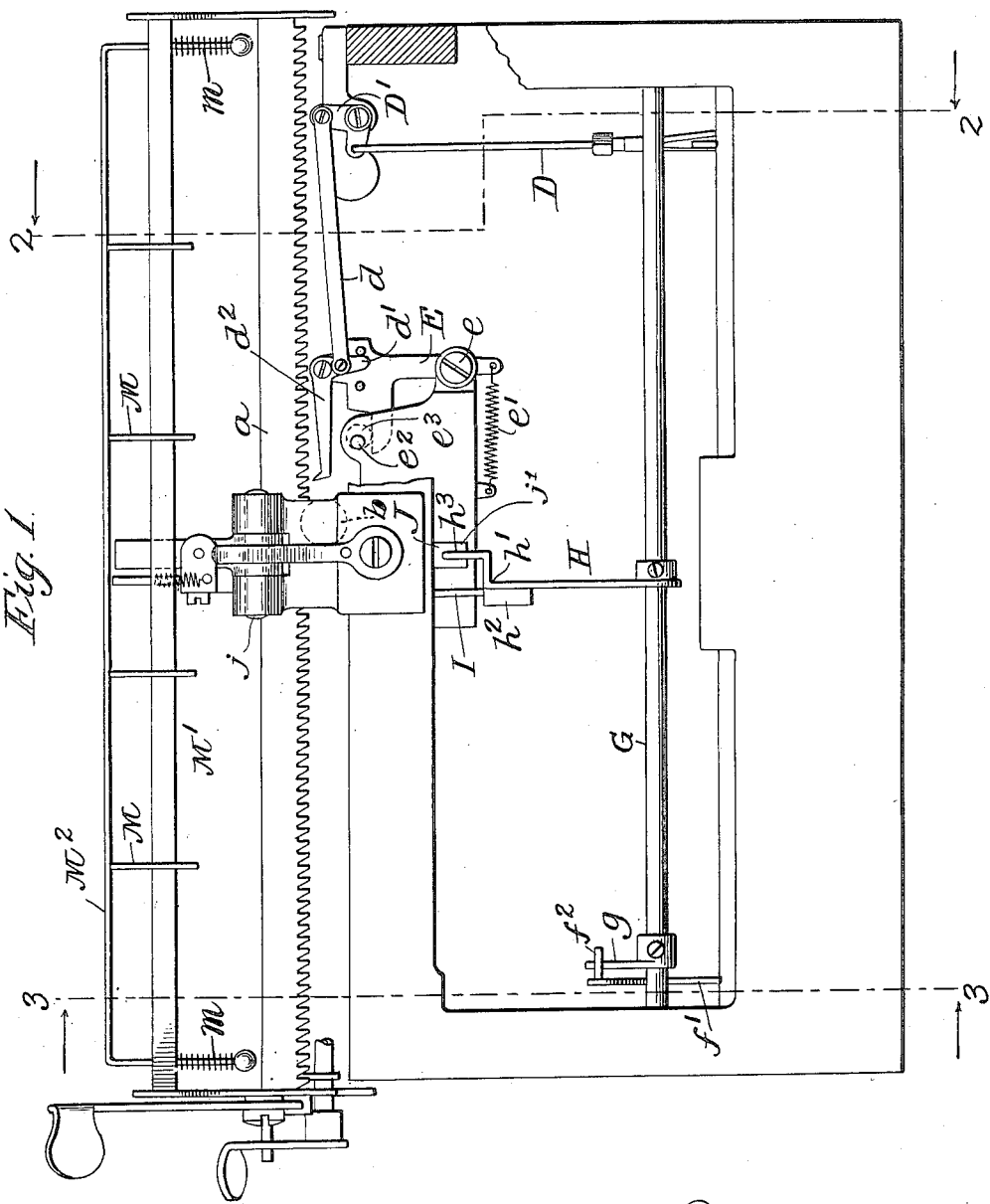

E. B. HESS.
WRITING MACHINE.
APPLICATION FILED MAY 15, 1907.

1,101,544.

Patented June 30, 1914.
7 SHEETS—SHEET 1.

WITNESSES
James F. Duhamel
Julius H. Lutz

INVENTOR
Edward B. Hess
BY
Edward C. Davidson
ATTORNEY

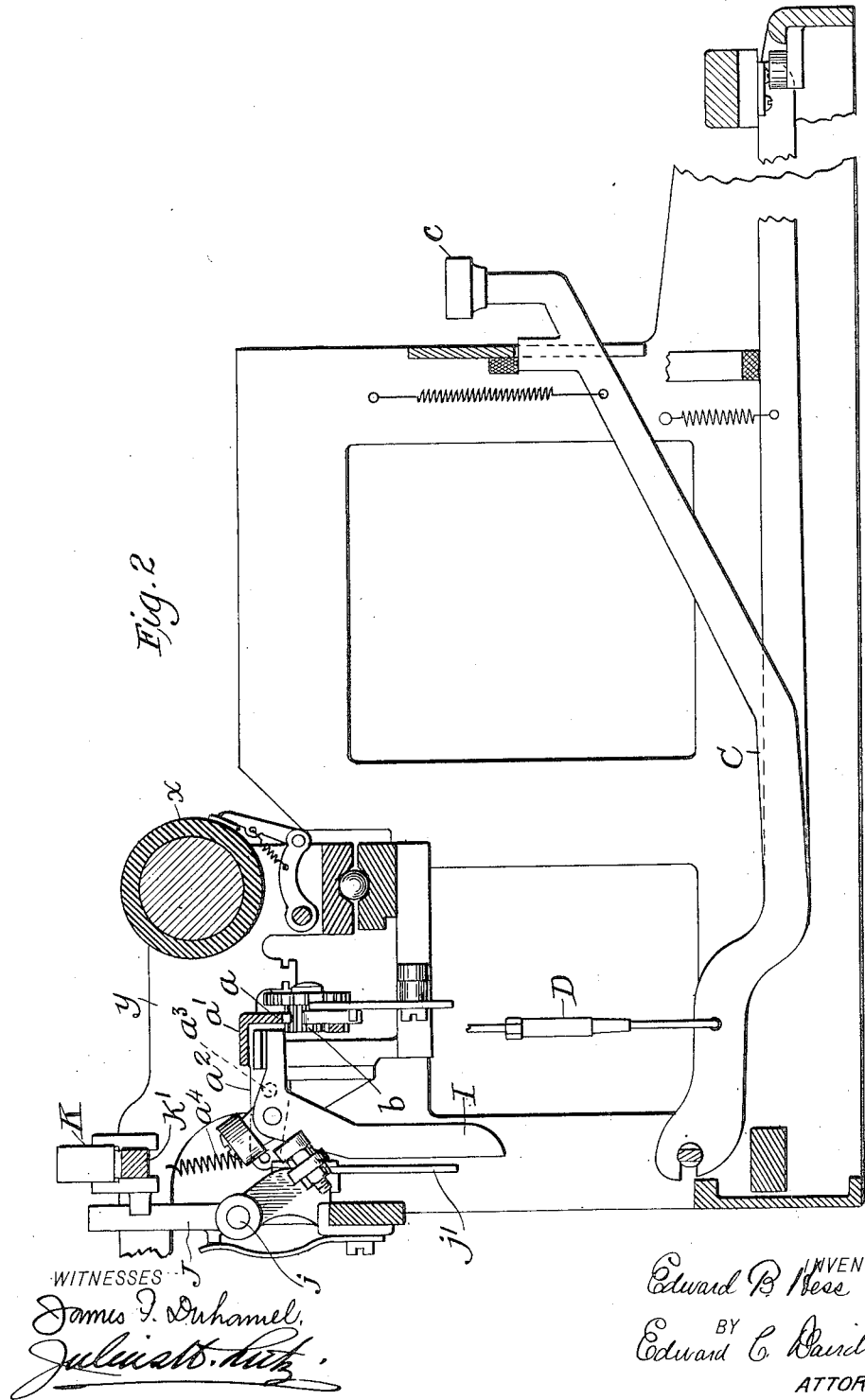

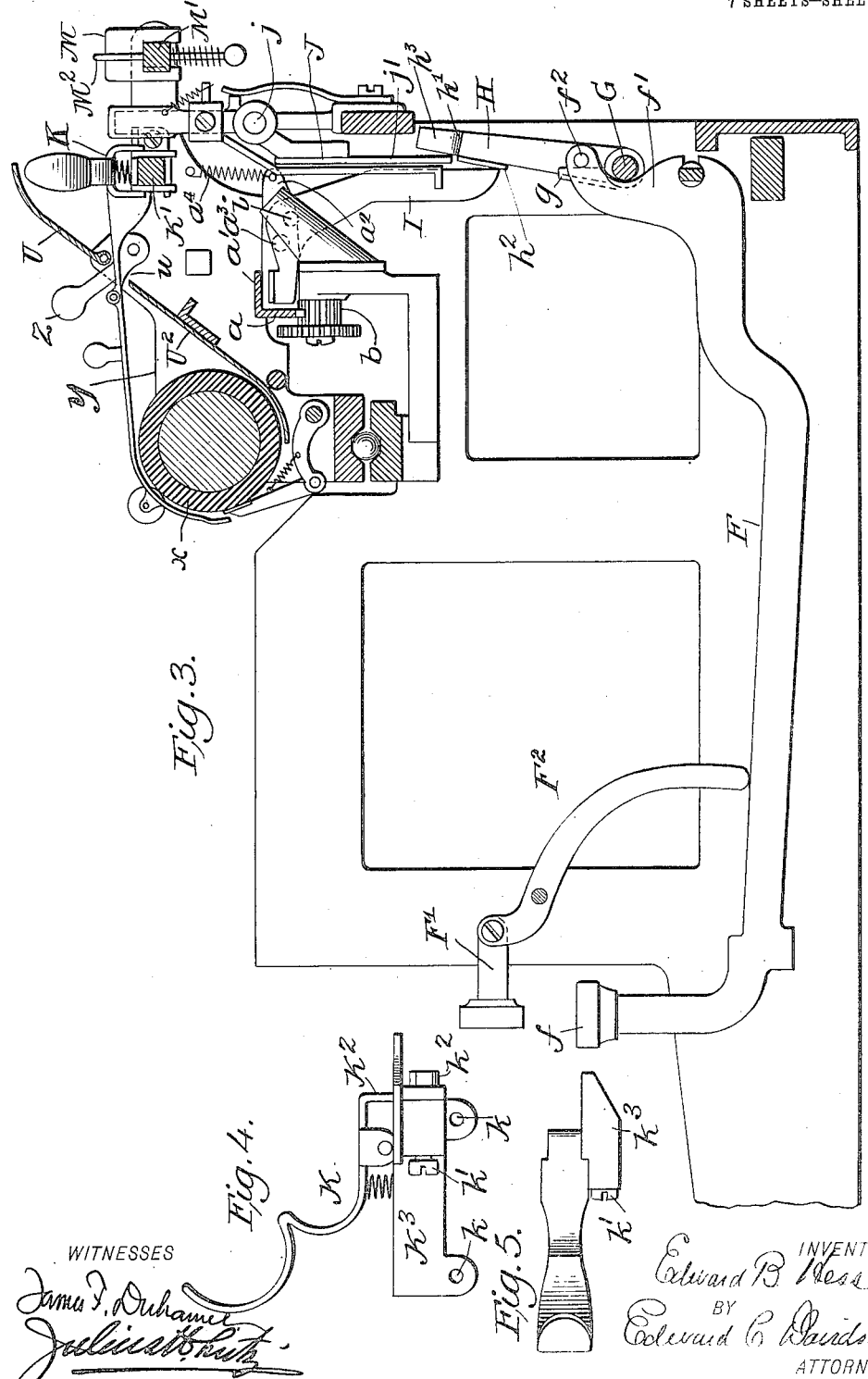

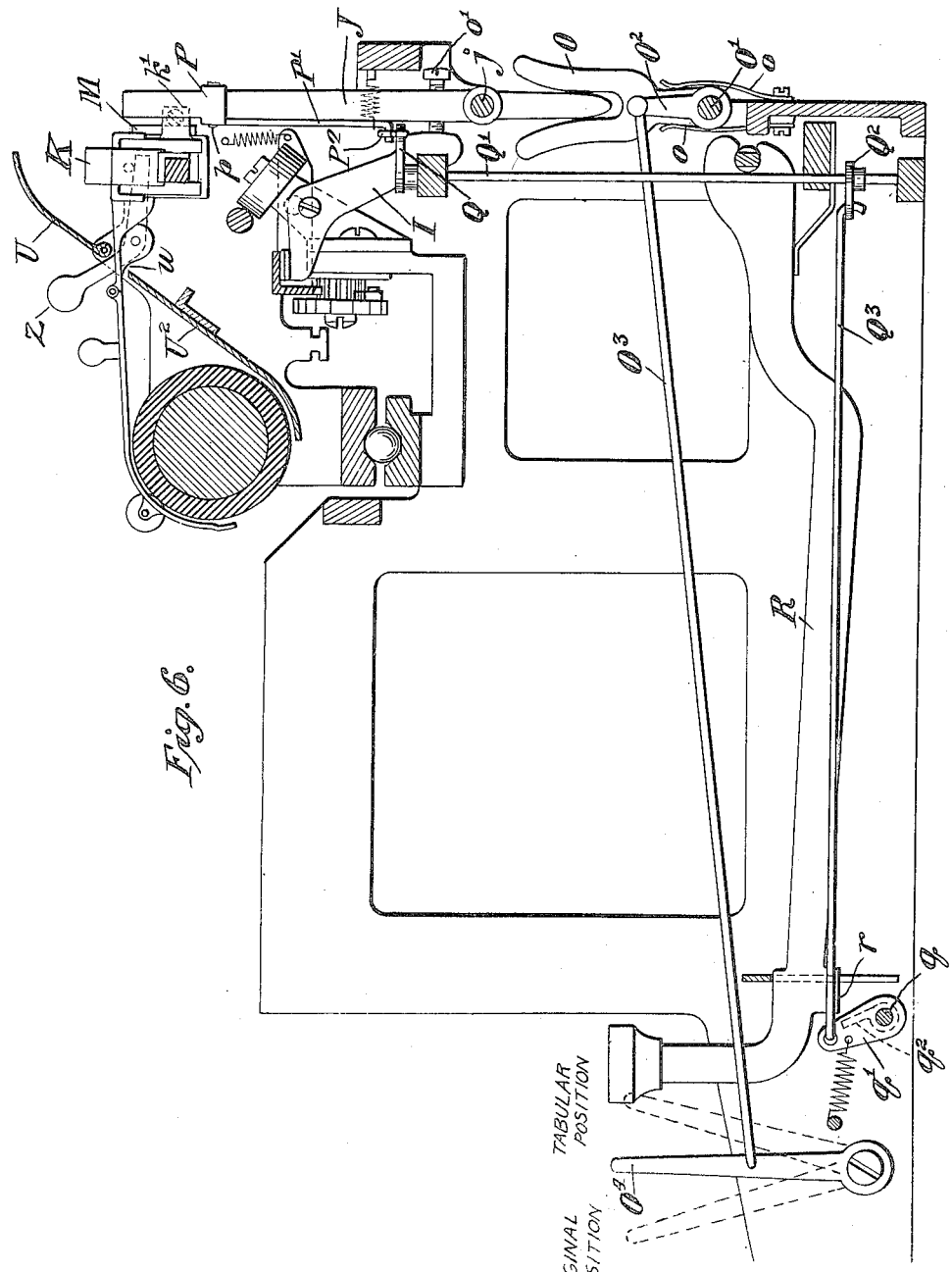

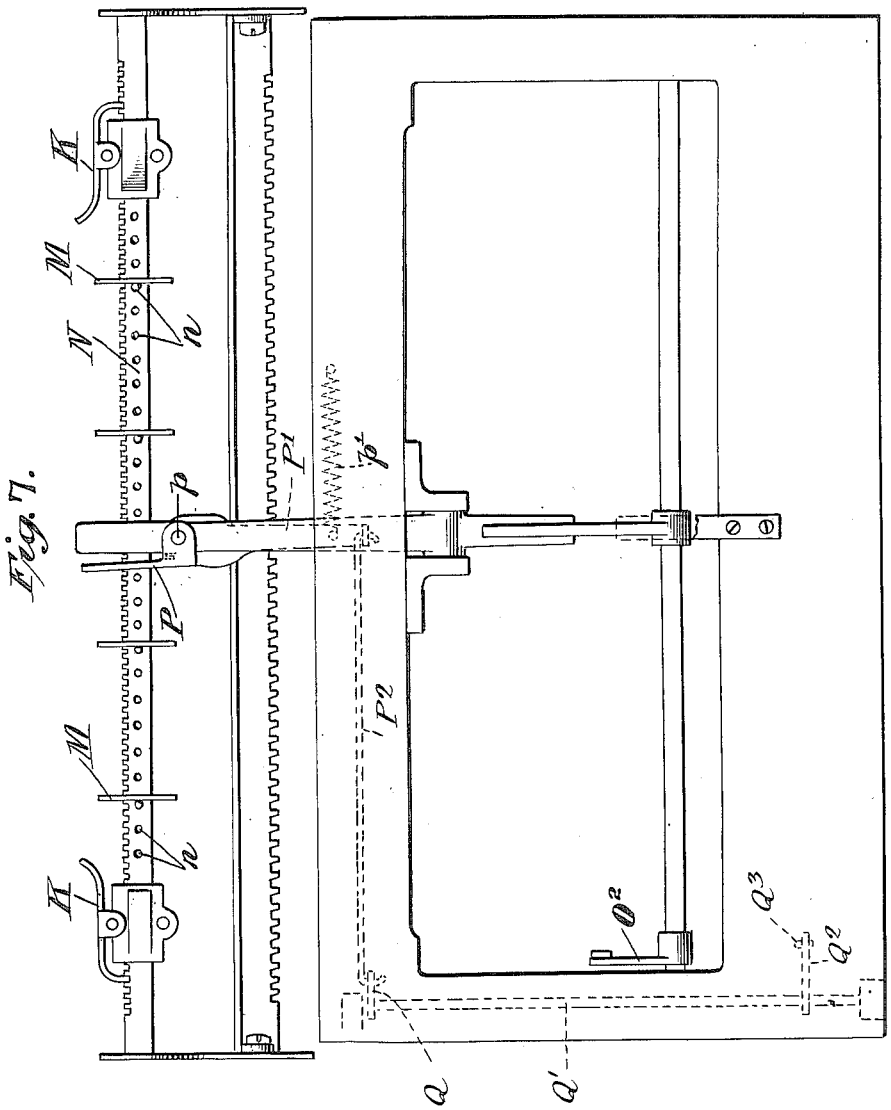

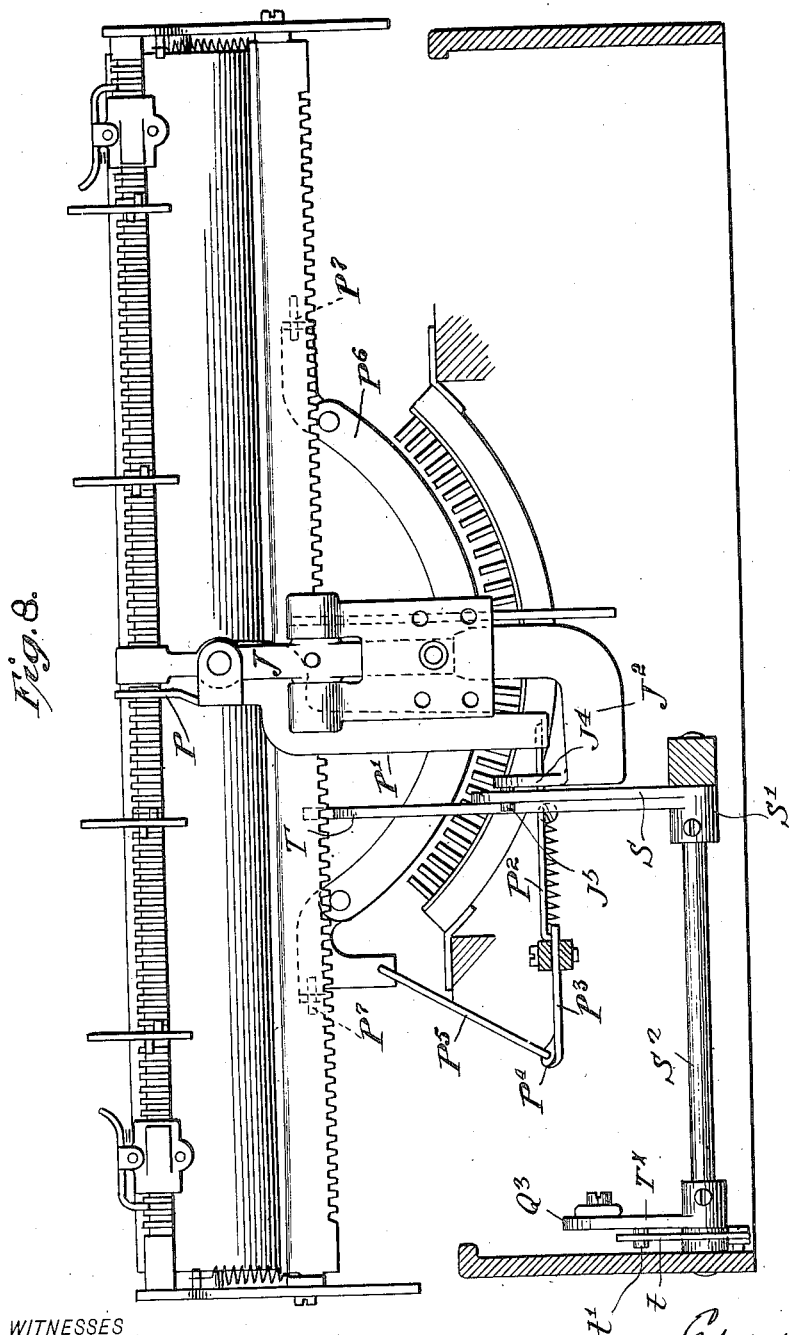

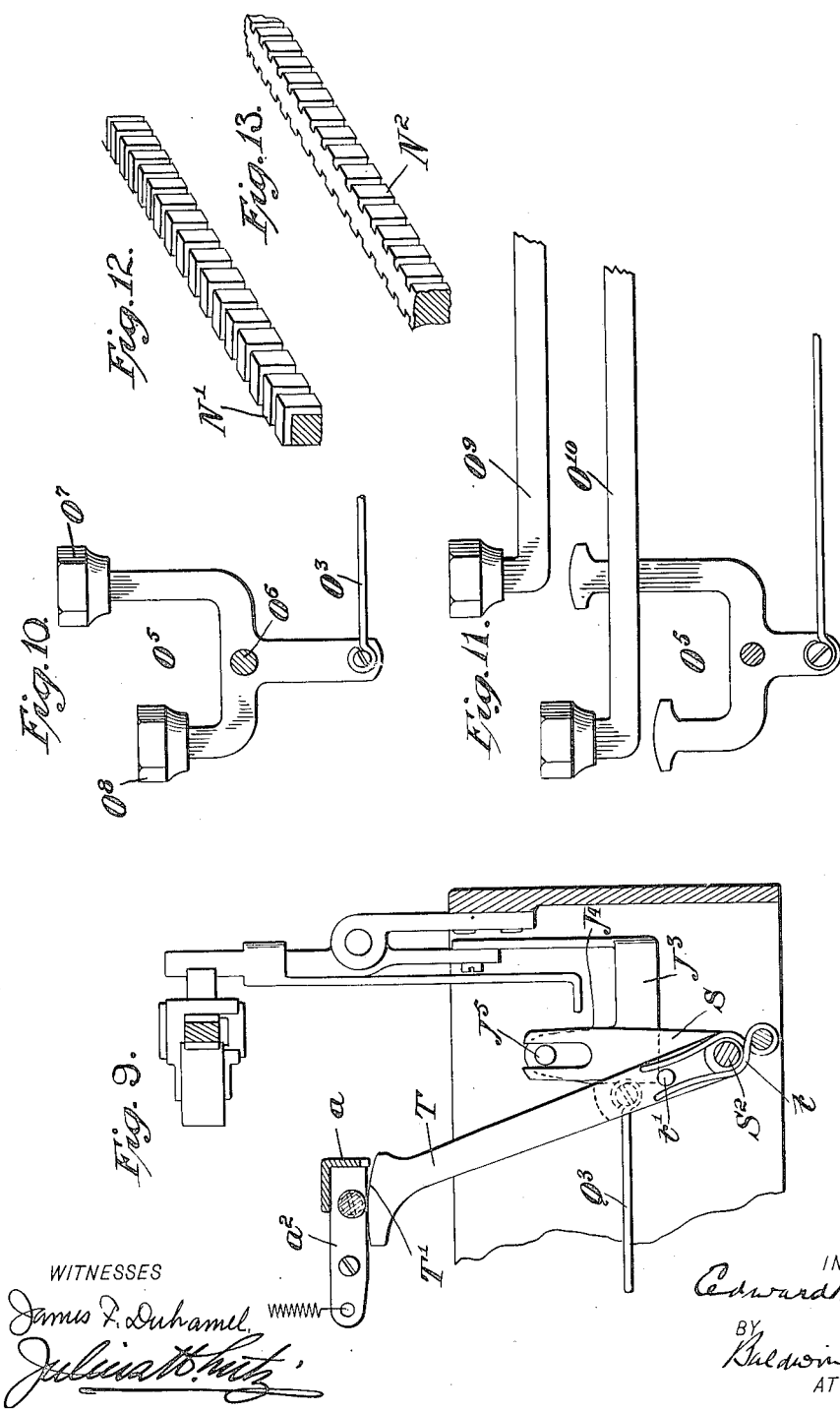

UNITED STATES PATENT OFFICE.

EDWARD B. HESS, OF NEW YORK, N. Y., ASSIGNOR, BY MESNE ASSIGNMENTS, TO ROYAL TYPEWRITER COMPANY, INC., OF NEW YORK, N. Y., A CORPORATION OF NEW YORK.

WRITING-MACHINE.

1,101,544. Specification of Letters Patent. Patented June 30, 1914.

Application filed May 15, 1907. Serial No. 373,849.

*To all whom it may concern:*

Be it known that I, EDWARD B. HESS, a citizen of the United States, residing in the borough of Brooklyn, city and State of New York, have invented certain Improvements in Writing-Machines, of which the following is a specification.

In tabulating work on typewriting machines which have what is known as a tabulator or jumper key, it is the custom to set the tabulator stop at the hundreds of dollars column. In recording transactions in retail trade, in most classes of business, the sales made at prices less than one dollar are far in excess of those for a dollar or more and those for a dollar or more are considerably greater than those for ten dollars or one hundred dollars or more. It follows, therefore, that for recording the great majority of sales, the space key or bar must be repeatedly operated after the tabulator stop has arrested the carriage at the hundreds of dollars column. This requires close attention of the operator and a considerable amount of labor and also subjects the machine to material wear.

One of the purposes of this invention is to minimize the necessary number of manipulations of the space bar and simplify and facilitate the production of accurate tabulated work. To this end, the machine thus equipped with proper tabulator stops and a tabulating or jumper key preferably in the key board is also provided with a key by the manipulation of which the carriage may be set back from the position in which it is arrested by the tabulator stop. With such an organization, the tabulator stop may be set to arrest the carriage at the decimal point and then in the great majority of instances the use of the space key is not required since the transaction is then recorded by the mere depression of the figure keys. If the transaction is that of a dollar or more it is only necessary to set the carriage back one step by manipulation of the back feed key, also preferably in the key board; two steps for a ten dollar transaction; and three for a hundred dollar transaction, etc: but, as stated, the back feed steps required are relatively few in number. This arrangement very materially relieves the operator and eliminates wear of the machine.

This invention further comprises a new form of tabulator in which the tabular stops and margin stops are all carried upon the same bar and engaged in the operations of the machine by a single part rocking or moving transversely to the rail and provided with means whereby different ranges of movement may be imparted to it; and the combination of such devices with line-lock devices.

In the accompanying drawings; Figure 1 is a rear elevation of so much of a typewriting machine as is desirable to illustrate this invention; Fig. 2, a section on the line 2, 2, of Fig. 1; Fig. 3, a section on the line 3, 3, of Fig. 1; Fig. 4, a rear elevation of a form of margin stop that may be employed; Fig. 5, a plan view thereof; Fig. 6, a vertical longitudinal section showing a modified construction in which the margin and tabular stops are carried upon the same rail, margin paper clamps are attached to and movable with the margin stops; and line lock devices operating upon the key levers when either the right hand margin stop or a tabular stop is engaged. Fig. 7, a partial rear elevation of Fig. 6; Fig. 8, a rear elevation showing a line lock device operating directly upon the type bars or type bar heads; Fig. 9, a detail vertical longitudinal section showing a modification in the construction of the means for effecting jump of the carriage from one tabular stop to another. Fig. 10, a detail view showing a special form of double crank lever for operating the frame stop that engages the margin or tabular stops; Fig. 11, shows a modification of the same; Figs. 12 and 13 are respectively detail views of toothed stop bars that may be employed.

A detail description of Figs. 1 to 5 inclusive will be given first. The drawings indicate a front strike machine of which X is the platen and Y the carriage. The type bars and segment in which they are pivoted may be of any usual or appropriate character and are not shown.

*a* is an ordinary rack for meshing with the usual pinion *b* turning with the escape wheel. At the left hand side of the key board is a back-feed finger piece *c* carried by a back-feed key-lever C pivotally mounted at its rear end and having connected to it the lower end of a vertically disposed link D, the upper end of which is connected to a horizontally disposed arm of a bell crank lever D' pivoted in a bracket on the side plate of the frame and having attached to its upwardly extending arm a horizontally disposed link $d$ pivoted to the downwardly extending arm $d'$ of a horizontally disposed pivoted back feed pawl $d^2$. This pawl is pivoted in a vertically disposed plate E pivoted at $e$ and having a spring $e'$ applied to its lower end. The downwardly extending tail piece or arm $d'$ of the back-feed pawl plays between limiting stops on the plate and the plate is limited in movement and guided by a fixed but adjustable eccentric $e^3$ on a stud bolt $e^2$ mounted in the rigid part of the frame in which the plate is pivoted. Normally, the parts are in the position indicated in Fig. 1. When the back-feed key is depressed, link $d$ is urged toward the center line of the machine rocking the back feed pawl into engagement with the rack. Further movement of the pawl about its own axis is limited by the stop on the plate. Thereafter, during further depression of the back-feed lever the plate turns upon its axis moving toward the center line of the machine, i. e. to the left as viewed in Fig. 1, carrying with it the back-feed pawl and setting the rack back one step or printing space. This arrangement for setting the carriage back one or more spaces by one or more depressions of the back-feed pawl has been shown by experience to be convenient and efficient. Other arrangement may be adopted. It is obvious that by adjustment of $e^3$ a greater range of movement than one letter space may be obtained.

At the right hand side of the key board is a tabulator finger piece $f$ carried by a jumper or tabulator key-lever F pivotally mounted at its rear end and having an extension $f'$ extending upwardly from its pivot and provided at its end with a laterally projecting pin $f^2$ that engages a radial projection $g$ on a rock shaft G to which is secured, in about the longitudinal center of the machine, an upwardly extending arm H formed with an offset at $h'$ near its upper end and there equipped with a flat plate $h^2$ adapted to engage the downwardly extending end of a lever I pivoted at $i$ and having its upper forwardly projecting end extending under the horizontal flange $a'$ of the rack bar $a$ which is carried by rearwardly extending arms $a^2$ pivoted at $a^3$ in the side plates of the machine and having reaction springs $a^4$ applied thereto. The upper end $h^3$ of the arm H on the rock shaft G engages the lower end $j'$ of a tabulator lever J pivoted at $j$ and extending upwardly into position to engage either the margin stop blocks K or the tabulator stops M. In the normal position indicated, Figs. 2 and 3, the lever J is in position to abut against the margin stops from which it may be released by partial depression of the key lever F effected by the finger piece $f$ or by the push pin F' and auxiliary lever F$^2$ sufficiently far for that purpose without disengaging the rack from its pinion; whereas full depression of the key F carries the upper end of the lever J into position to arrest a tabulator stop M on the carriage after lever I has been moved sufficiently to lift the rack from engagement with its pinion to permit the jump or free run of the carriage.

With an organization such as described, the tabulator stops may be set at the decimal point. Sales of less than one dollar which, in so many instances constitute the great mass of transactions, may thus be recorded without any manipulation whatever of the space key. If the transaction to be recorded requires record in the dollar column, it is only necessary to operate the back stop lever $c$ once to set the carriage back one letter space.

A special form of margin stop is shown in detail in Figs. 4 and 5. The margin stop bar K' has its upper surface toothed to be engaged by the pivoted spring latch K$^2$ mounted on the stop frame K$^3$ which straddles the bar and is held in position thereon by cross pins $k$ extending beneath the bar and connecting lugs on opposite sides of the frame. The part of the stop against which abuts the side of stop lever J is the head $k'$ of an adjustable screw mounted in a lateral projection of one of the sides of K$^3$ and having applied to its end a lock nut $k^2$. A bevel plate $k^3$ mounted upon or forming the outer wall of the projection in which the screw is mounted, presses the stop lever J out of the way when the carriage is moved in return direction.

The details of construction of the tabulator stops are immaterial. As shown in Figs. 1 and 3 the tabular stop bar M' is recessed in its front face (see dotted line Fig. 3) to receive tabulator stops M that straddle the bar and fit in such recess. The stops are all held in position by a rod M$^2$ that is turned at right angles at each end to pass through vertical apertures in the bar. The ends of the rod have enlargements between which and the bottom of bar M' are interposed coiled springs $m$ whose reaction draws the rod down upon the upper edges of the several tabulator stops and holds them in position.

In Figs. 6 and 7 N is a bar that carries both the margin stops K and tabular stops M. Its upper surface is toothed, as shown, and in that respect it differs from the bar M' which is toothed upon its rear surface. The bar may, of course, be made in any appropriate way, as in Figs. 12 and 13 for instance, in the former of which the bar N' is toothed upon the top and rear sides, and in the latter, the bar N$^2$ is toothed upon the front and rear sides. The tabular stops will, of course, be correspondingly adapted to the bars. Fig. 7 shows the bar N as having a series of horizontal apertures $n$ for the reception of pins that may be used in lieu of the plate tabulator stops M. The stop lever J pivoted upon the frame at $j$ is adapted to be moved transversely to the tabulator bar and may be constructed substantially as is the corresponding lever J shown in the earlier figures of drawing but has been illustrated with slight differences of detail as will presently be described. In normal position, it is adapted to miss the tabular stops M but engages the stop head $k'$ of the margin stop. To disengage it from the margin stop, it is moved away from the bar. To cause it to engage a tabular stop, it is moved from normal position closer to said bar.

In the construction shown in Figs. 6 and 8, the lever J is shown as a straight lever and below its pivot it fits in between the jaws of a rocking bifurcated arm O carried by a rock shaft $O'$ pivoted in the frame and having at its right hand end a vertically projecting arm $O^2$ attached by link $O^3$ to a vertically disposed lever arm $O^4$ located at the right hand side of the keyboard. Spring $o$, $o$, bearing respectively upon opposite sides of the vertically disposed bifurcated part O tend to maintain it in central position. Above the pivot $j$ of the stop lever J, the latter has an adjustable screw $o'$ that engages the lower rear face of the rack releasing lever I. As will be apparent from Fig. 6, when the lever arm $O^4$ is drawn to the front the upper end of the stop lever will be rocked away from the bar N. This movement occurs to such extent as to disengage the part $k'$ of the margin stop to permit the writing of one or more letters at the end of a line. When the lever arm $O^4$ is pressed rearwardly, the upper end of lever J will be swung toward the tabular and margin stop bar. This movement should occur to such extent as to cause such lever to engage a tabular stop M on the bar. Pivoted at $p$ to the right hand side of the stop lever J at a suitable point above the pivot $j$ of the latter, is a pivoted plate P whose axis $p$ is at right angles to axis $j$. This plate extends upwardly substantially as far as the stop lever J and is normally held away from it by the reaction of a spring $p'$. An extension $P'$ from the plate P extends below its pivot a suitable distance and is connected by link $P^2$ with a radial arm Q (Figs. 6 and 7) on the upper end of a vertical rock shaft $Q'$ having near its lower end a radial arm $Q^2$ from which extends forward a link $Q^3$ connected at its front end with a radial arm $q'$ attached to a transverse rock shaft $q$ near one end. The rock shaft $q$ has extending upward from it a key lever locking plate or blade $q^2$ which inclines slightly forward from a vertical line; and on each lower edge of each character key lever R near its front end is formed a downward projection $r$, the front corner of which is closely adjacent the locking plate $q^2$. It will be obvious that when a tabular stop or the right hand margin stop is engaged by the stop lever J, P that such stop will first strike the pivoted plate P and carry it against the end of J. This movement through the connections described will rock the shaft $q$ carrying the locking plate $q^2$ forward under the projections $r$ on all the character key levers and lock them against operation. A characteristic of this type bar lock is that the amount of movement required to put it into effective operation is very small.

In lieu of the vertically disposed rocking lever $O^4$, the combination lever $O^5$ shown in Fig. 10 may be employed. It is provided with two branches extending upwardly one in the front and the other in the rear of its axis $O^6$ and having finger pieces applied thereto. The end of the lever below its axis is coupled to the link $O^3$. When the front finger piece $O^7$ is depressed, the link $O^3$ will be drawn forward and the combination stop lever J P will be moved to disengage the margin stop. When the front finger piece $O^8$ is depressed, the upper end of the said lever will be moved toward the tabular bar to engage a tabular stop. In Fig. 12 substantially the same arrangement is shown except that the bifurcated rocking lever $O^5$ is operated by two horizontally disposed key levers $O^9$, $O^{10}$ which, when depressed, respectively strike an arm of the bifurcated lever $O^5$.

In Fig. 8, a different form of line lock, is shown. The end $P'$ of the combination stop lever J P is extended farther down and at its lower end is connected to a link $P^2$ attached to the forwardly extending arm $P^3$ of a bell-crank lever whose laterally extending arm $P^4$ is attached to a forwardly and upwardly extending link $P^5$ connected at its front end to a rocking segmental plate $P^6$ whose pivots $P^7$ are above the type bar heads. When in normal position the curved lower face of the part $P^6$ is in front of the type bar heads. When a stop is engaged by the pivoted part P a rearward pull is imparted to link $P^5$ which operates to draw the segmental locking part $P^6$ over the type bar heads preventing their passage to the printing point should a character key be depressed.

Figs. 8 and 9 show a modification in the apparatus for operating the stop lever J and releasing the rack from the escapement pinion. The lower end of the stop lever J is turned and extends laterally toward the right hand side of the machine as indicated at $J^2$, Fig. 8, and is then turned at right angles and extends forward as indicated by J³, Fig. 9, and finally at its extreme end it has a vertical part J⁴ in the upper end of which is a projecting stud J⁵. This stud is embraced by the jaws of a bifurcated lever arm S carried by a sleeve S' fixed on a rocking shaft S² extending inwardly from the right hand side plate of the machine. The shaft S² near its outer end also carries an upwardly extending arm T˟ to which is connected the rear end of link Q³. The two ends of a torsion spring t embrace a stud t' on the side of the arm T and serve to maintain it in normal position. The sleeve S' also carries an upwardly extending arm T whose upper end is formed with an elongated convexly curved edge T' that contacts with the under edge of the rack a. When the link Q³ is thrust rearwardly, the upper end of T operates to lift the rack out of engagement with the escapement pinion and at the same time, the bifurcated arm S acting upon the stud J⁵ serves to throw the lower end of the stop lever J rearwardly. The parts are so arranged that when the rack is disengaged from the pinion, the upper end of combination stop lever J P is in position to be engaged as already described by a tabular stop. When link Q³ is drawn forwardly, the rack is not disturbed but the upper end of stop lever J P is carried rearwardly to disengage the margin stop.

No claim is made in this application to the line-lock devices irrespective of the margin stop devices.

I claim:

1. Margin stop and tabular devices for a writing machine comprising a margin stop and a tabular stop arranged in the same general line transversely of the machine and the former projecting beyond the latter, a movable stop device located at one side of the transversely arranged stops, means for moving said device away from said stops to effect its disengagement from the margin stop and toward said stops to effect its engagement with the tabular stop.

2. Margin stop and tabular devices comprising a single stop rail, a margin stop and a tabular stop adjustably mounted on said rail and both projecting therefrom in the same direction, the margin stop projecting beyond the tabular stop, a movable stop device adapted to be moved away from the rail to disengage it from the margin stop and toward the rail to engage it with the tabular stop.

3. Margin stop and tabular devices comprising a single transverse rail, a margin stop and a tabular stop arranged thereon, a movable stop device normally in position to be engaged by the margin stop and means for imparting to said device two movements one to disengage it from the margin stop and the other to cause its engagement with the tabular stop.

4. A writing machine comprising the combination of a margin carriage stop and a carriage stop located at the inner side of the margin stop, a single stop rail moving with the carriage and upon which both said stops are mounted, a coöperating movable frame stop adapted at the will of the operator to engage either of said carriage stops to arrest the movement of the carriage, and a paper feeding device controlled by said margin stop.

5. A writing machine comprising the combination of a margin stop, a paper feeding device mounted upon said margin stop, a carriage stop located at the inner side of the margin stop, a single carriage rail upon which said stops are adjustably mounted, margin stop projecting from the rail a greater distance than the inner stop, a movable frame stop and manually operated adjusting means whereby the frame stop may be set to engage either the carriage margin stop or the inner carriage stop.

In testimony whereof I have hereunto subscribed my name.

EDWARD B. HESS.

Witnesses:
JOHN M. LEE,
E. F. WICKS.